United States Patent [19]
Abe et al.

[11] Patent Number: 5,956,461
[45] Date of Patent: Sep. 21, 1999

[54] CAMCORDER AND CONTROLLER

[75] Inventors: Hiroya Abe, Omiya; Hideo Nishijima; Kouji Minabe, both of Hitachinaka; Teruo Hoshi, Mito; Michio Sagawa, Hitachinaka; Kouji Kaniwa, Yokohama, all of Japan

[73] Assignee: Hitachi, Ltd., Tokyo, Japan

[21] Appl. No.: 08/736,993

[22] Filed: Oct. 25, 1996

[30] Foreign Application Priority Data

Oct. 31, 1995 [JP] Japan ................................. 7-282879

[51] Int. Cl.$^6$ .............................. H04N 5/92; H04N 5/225
[52] U.S. Cl. ........................................ 386/117; 348/358
[58] Field of Search .................................. 386/117, 107, 386/118–121, 38; 358/906, 909.1; 348/207, 358, 333–334, 372; H04N 5/76, 9/79, 5/225

[56] References Cited

U.S. PATENT DOCUMENTS

| | | | |
|---|---|---|---|
| 4,353,118 | 10/1982 | Heimgartner et al. | 364/510 |
| 4,531,164 | 7/1985 | Maeda et al. | |
| 5,099,364 | 3/1992 | Kawabata | |
| 5,134,487 | 7/1992 | Taguchi et al. | 358/909.1 |
| 5,221,965 | 6/1993 | Okino | 358/909.1 |
| 5,257,058 | 10/1993 | Mabuchi | 348/358 |
| 5,424,772 | 6/1995 | Aoki et al. | 348/334 |
| 5,523,857 | 6/1996 | Fukushima | 358/909.1 |
| 5,579,048 | 11/1996 | Hirasawa | 348/333 |
| 5,615,057 | 3/1997 | Fukuta et al. | 386/117 |
| 5,650,819 | 7/1997 | Sato et al. | 348/358 |

FOREIGN PATENT DOCUMENTS

| | | |
|---|---|---|
| 0 066 776 A1 | 12/1982 | European Pat. Off. . |
| 0 343 016 A2 | 11/1989 | European Pat. Off. . |
| 0 637 169 A2 | 2/1995 | European Pat. Off. . |
| 57-196673 | 12/1992 | Japan ........................ H04N 5/782 |
| 7-099598 | 4/1995 | Japan ........................ H04N 5/232 |
| 7-143379 | 6/1995 | Japan ........................ H04N 5/225 |

*Primary Examiner*—Thai Tran
*Attorney, Agent, or Firm*—Antonelli, Terry, Stout & Kraus, LLP

[57] ABSTRACT

A VCR integrally provided with a camera (camcorder) stops power supply at a non-recording mode for reducing power consumption. The camcorder is arranged to have power control units and a switch for controlling the start or the end of the recording operation and the power-on or power-off of at least one or more of a camera section, a VCR section and a display section, a time measuring unit, and a control unit for starting the recording unit a predetermined time later than when the camera section starts to pick up an image sequence and the image sequence appears on an electronic viewfinder or the like. Further, the camcorder includes units for moving a zoom lens to a Wide-terminal when powered off, when powered on or a predetermined time later than when powered off. Moreover, there are provided units for overlapping text information with the image sequence appearing on the electronic viewfinder. These units display a time left until the recording start. The camcorder further provides units for varying a predetermined time left until the recording start and units for selecting a moving timing on which the zoom lens is moved to the Wide-terminal so that the user may freely set the predetermined time and the moving timing.

6 Claims, 14 Drawing Sheets

CAMCORDER AND CONTROLLER

BACKGROUND OF THE INVENTION

The present invention relates to a video cassette recorder (called VCR) integrally provided with a camera and more particularly an improvement for extending the serviceable time when it is battery-powered and for enhancing the operativity.

A VCR integrally provided with a camera (called a camcorder) includes as one of the image pickup techniques a technique of achieving a clean splice between the adjacent image sequences on the video tape obtained by the repetition of recording and pausing. The conventional camcorder has a standby mode at which the recording operation is paused. At this standby mode, a camera section stays in an image pickup state, while a VCR section stays in a recording pause state (REC pause) that does not operate to record the image. Hence, the camcorder even at the standby mode consumes the substantially same electric power as that at the recording mode. This results in disadvantageously shortening the serviceable time when the recording is actually allowed, because the camcorder is often battery-powered. In order to avoid the power consumption of the camcorder at the standby mode, after the recording is finished, the camcorder may be constantly powered off. However, when the recording is restarted, it is necessary to take the two steps of operating a power switch and then a recording button. To reducing this burdensome two-step operation, for example, the apparatus as disclosed in JP-A-57-196673 is arranged to interrupt power supply to the camera section and the VCR section when the camcorder is at the standby mode and supply power when the recording is restarted.

The current camcorder mainly provides an LCD or an electronic viewfinder arranged to use a small CRT or a LCD for checking an image sequence picked and recorded by the camcorder itself. The power control of the foregoing prior art keeps the VCR section as well as the camera section inoperative when the power is interrupted, so that this power control disadvantageously disallows a user to check the picked images through the electronic viewfinder. In actual, it is necessary to take some burdensome steps of turning on the camcorder and define an angle of field after a picture appears on the electronic viewfinder. It means that if the camcorder is operated for recording immediately after it is powered, the camcorder may record an image sequence the user does not intend. Further, a camcorder provided with a zoom lens having a variable focal length provides a shooter with a narrower field of the electronic viewfinder if the lens is zoomed in to the Tele-terminal (where a magnified picture appears on the viewfinder). Hence, it takes a longer time for the shooter to find an object to be imaged within the field of view. This may lead to recording an undesired image.

SUMMARY OF THE INVENTION

In the camcorder arranged to interrupt power supply when it is not operated for recording, for improving the foregoing disadvantages and lowering the power consumption, it is a main object of the present invention to overcome improper setting of an angle of view due to disability to check a picture on a viewfinder or the like when a camcorder is started It is a further object of the present invention to provide a camcorder that is arranged to repetitively start and pause a recording operation at short intervals without movement of a zoom lens to the Wide-terminal each time the recording operation is started or paused It is a yet further object of the present invention to provide a camcorder that is arranged so that the user can set an angle of view as he or she gets a remaining time being changed until the start of the recording.

In carrying out the foregoing objects, the camcorder provides one or more switches and power control units for controlling a start and an end of recording and controlling at least one power supply of a camera section, a VCR section and a display section on and off. Further, the camcorder provides a time measuring unit and a control unit for starting a recording operation on a recording medium a predetermined time later than a time point when the camera section starts to record an image sequence so that the picture appears on the electronic viewfinder or the like.

Moreover, the camcorder provides means for moving the zoom lens to the Wide-terminal when powered off, when powered, or a predetermined time later than when powered off.

The camcorder provides means for overlapping text information with a picture appearing on the electronic viewfinder so that a time left until the recording is started is displayed on the viewfinder.

The camcorder provides means for varying a predetermined time taken to start the recording operation and means for selecting a moving timing of the zoom lens to the Wide-terminal so that the user may freely set the predetermined time and moving timing.

The aforementioned power control unit operates to stop the power supply to at least one of the camera section, the VCR section and the display section when the recording is finished. Hence, the power control unit makes it possible to lower the power depletion than the conventional camcorder or stop the overall power depletion. When the the recording is started, the waiting time is secured between when a picture appears on the electronic viewfinder and when the actual recording is started. Hence, during the waiting time, the user can set the angle of view as he or she desires. This prevents the unnecessary image sequence taken when the user adjusts the angle of view from being left in the recorded image sequence.

At the start of shooting, the zoom lens is located on the Wide-terminal at any time. Hence, the user can positively grasp an object to be picked on the electronic viewfinder.

Moreover, the operation of just one button by the user realizes the foregoing process. It means that no erroneous operation takes place and thus the operativity is enhanced.

Further, the time left until the start of the recording is displayed. Hence, the user can adjust the zooming degree of the zoom lens or the angle of view as he or she is grasping when the recording is started.

By varying the time left until the start of the recording, it is possible to cope with the requirement of the user for recording an image sequence at once without leaving the opportunity of catching the object. By selecting the saving timing of the zoom lens to the Wide-terminal, the zoom lens is not allowed to be moved back to the Wide-terminal if the recording is repetitively started or paused at short intervals.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Figure 1:
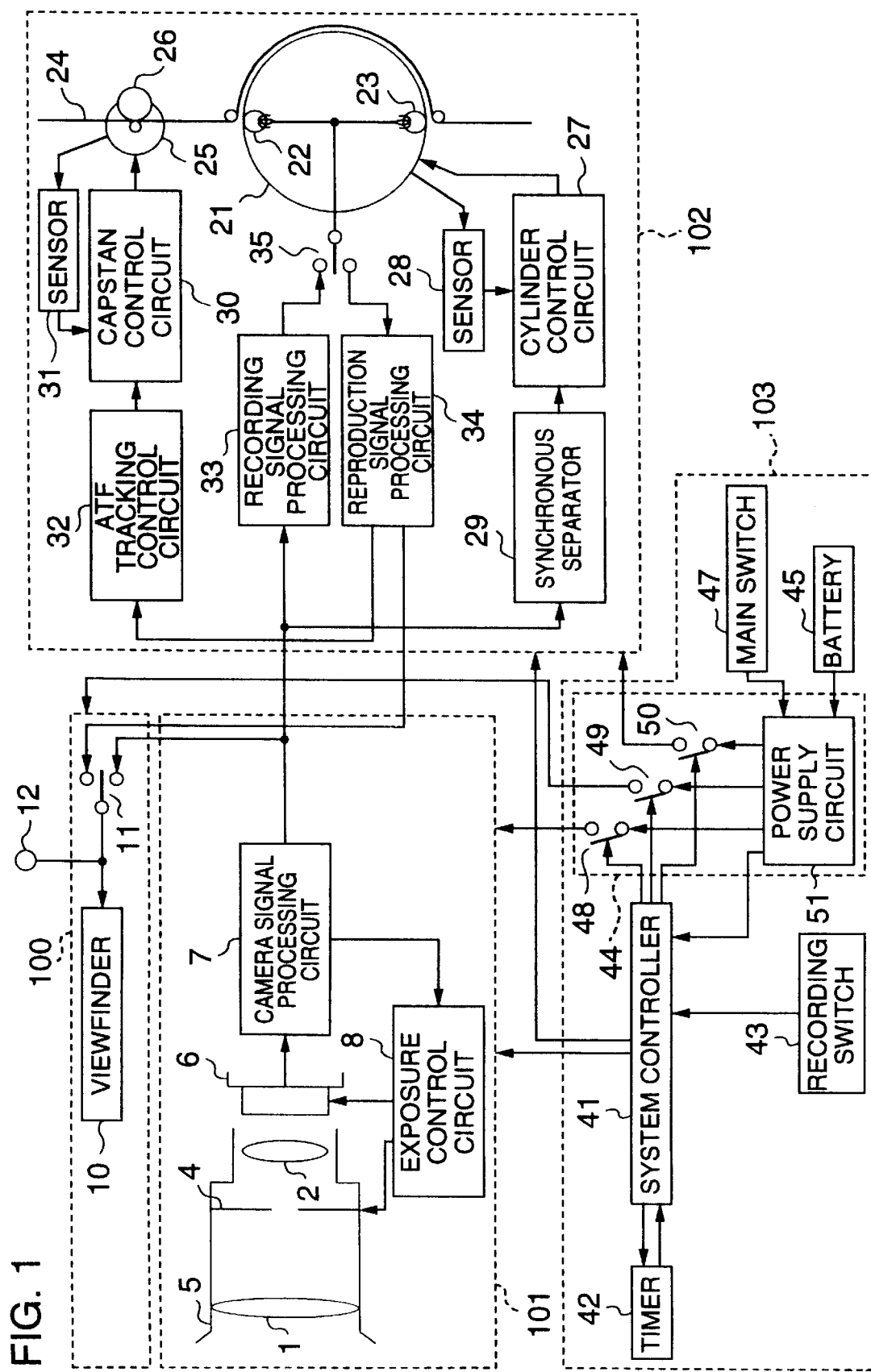
FIG. 1 is a block diagram showing a camcorder according to a first embodiment of the present invention.

Later, the details of the present invention will be described with reference to the drawings. FIG. 1 is a block diagram showing a camcorder according to the first embodiment of the present invention.

A block 100 enclosed by a dotted line is a display section. The display section 100 is arranged of an electronic viewfinder 10 that is a CRT or a LCD panel for displaying a picture being taken by a camera section or reproduced by a recording section, an external output terminal 12, and a switch for switching an image pickup signal into a reproduction signal or vice versa. In place of the electronic viewfinder, the LCD itself may be used.

Next, a block 101 enclosed by a dotted line is a camera section. The camera section 101 is arranged of a lens block 5 having lenses 1, 2 and an iris 4, an imaging element 6 (such as a CCD sensor), a signal processing circuit 7 for converting an output signal from the imaging element 6 into a video signal, and an exposure control circuit 8 for controlling an exposure time of the iris and the imaging element 6 for keeping the proper quantity of light applied to the sensor.

An image pickup signal produced by the camera section is recorded on a magnetic tape 24 located in the VCR section 102. Concretely, the image pickup signal from the display section 100 is applied to a recording signal processing circuit 33 in which the signal is converted into a recoding signal. Then, the recording signal is recorded on a magnetic tape through magnetic heads 22 and 23 mounted on a rotary cylinder (simply called a cylinder) 21. When reproducing the signal, a reproduction signal picked up by the magnetic heads 22 and 23 is sent to a reproduction signal circuit 34 in which the reproduction signal is converted into a video signal. A numeral 35 denotes a switch for switching a recording mode to a reproduction mode or vice versa. The magnetic tape 24 is transferred by the rotation of a capstan motor 25 with the tape 24 being pressed between a capstan shaft of the motor 25 and a pitch roller 26. The rotation of the cylinder 21 is controlled by a cylinder control circuit 27, based on the speed and phase information sent from a sensor 28. When recording the signal, the rotary phase of the cylinder 21 is required to be synchronized with the recording signal, so that a vertical synchronous signal (simply called a V sync) is separated from the image pickup signal sent from a pickup signal processing circuit 7 by a synchronous separator 29 and then is applied to a cylinder control circuit 27. Likewise, the rotation of the capstan motor 25 is controlled by a capstan control circuit 30, based on the speed information sent from a sensor 31. Several kinds of tracking systems have been proposed for reproducing the signal. The system of this embodiment utilizes an ATF (Auto Tracking Finding) system using a pilot signal, which is used in 8-millimeter video products. When reproducing the signal, an ATF tracking control circuit 32 is operated to extract a pilot signal from the reproduction signal and produce a tracking error signal. The tracking error signal is applied to an input of the capstan control circuit 30 for controlling a rotation phase of the capstan based on the tracking error signal.

A block 103 enclosed by a dotted line is a control block. A numeral 41 denotes a system controller using a microcomputer. The system controller 41 is operated to set and control various kinds of operation modes. The following description concerns with the control operation about the present invention. A numeral 43 denotes a switch (simply called a recording button) for indicating a recording start or end. A numeral 44 denotes a power control circuit for controlling the power supply from a battery 45 to each block. The internal arrangement of the power control circuit 44 may be roughly described as follows. A power supply circuit 51 operates to convert or stabilize a power signal from the battery 45 as requested. Switches 48, 49 and 50 are used for controlling distribution of electric energy to the display section 100, a camera section 101 and the VCR section 102 in response to an ON/OFF signal sent from the microcomputer 41. A numeral 42 denotes a timer circuit that is used for controlling the timing of the system controller. The timer circuit may be built in the system controller 41.

Later, the description will be oriented to how the first embodiment of the invention is operated with reference to a control flowchart of FIG. 2. When a main switch 47 is turned on, the power supply circuit 51 starts to distribute electric power to the microcomputer 41. At this time, the display section 100, the camera section 101, and the VCR section 102 are not powered. The pitch roller does not enter into a pressurizing state (called a pinch-off). The microcomputer 41 monitors the status of the recording button 43. When the microcomputer 41 senses that the button 43 is pressed, the microcomputer 41 operates to control the switches 48, 49 and 50 located in the power control circuit 44 for supplying electric power to the display section, the camera section and the VCR section. In response to the power supply, the camera section starts to pick up an image sequence and display the pickup image sequence on the electronic viewfinder 10. When powered, a timer 42 for measuring a time is reset and then is operated to start the measurement. Next, the cylinder of the VCR section is started and then is accelerated to 1800 rpm for the NTSC signal system or 1500 rpm for the PAL signal system in the case of the normal number of revolutions (8-millimeter VCR). After the cylinder is started, a loading motor (not shown) is driven so that the pinch roller is pressed against the capstan (called a pinch-on). When the timer 42 makes sure of the passage of a predetermined time, the capstan motor 25 is started so that a tape is run forward, when the tracking control is executed as the data-recorded portion is being reproduced. After the tracking control, the data recording is started.

Figure 3:
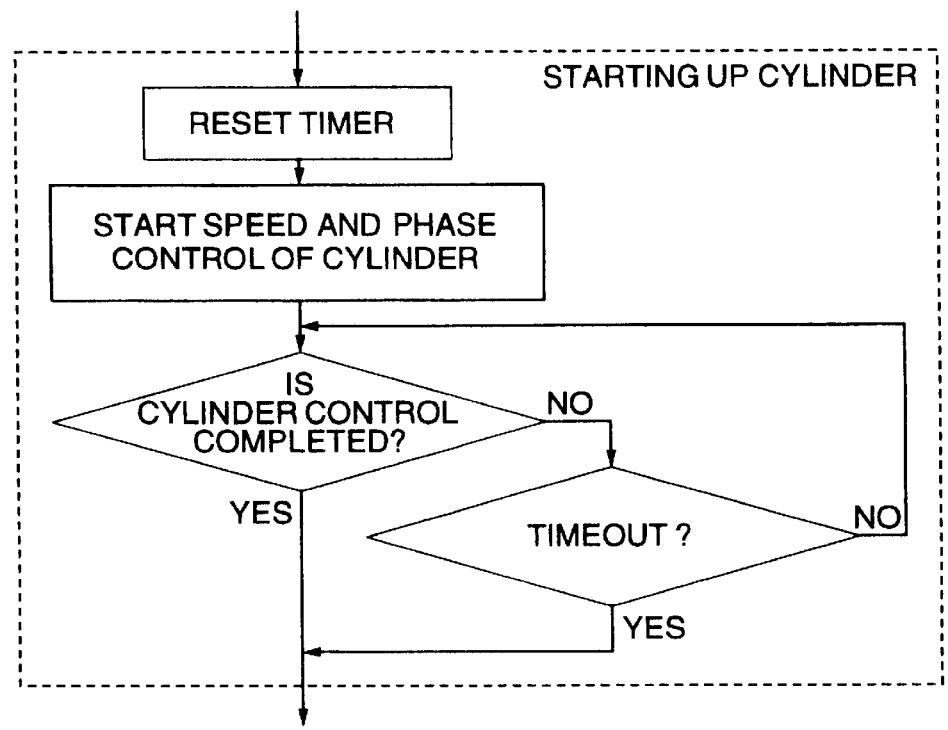
FIG. 3 is a flowchart showing a concrete example of a process for starting a cylinder, for describing the present invention.
Figure 4:
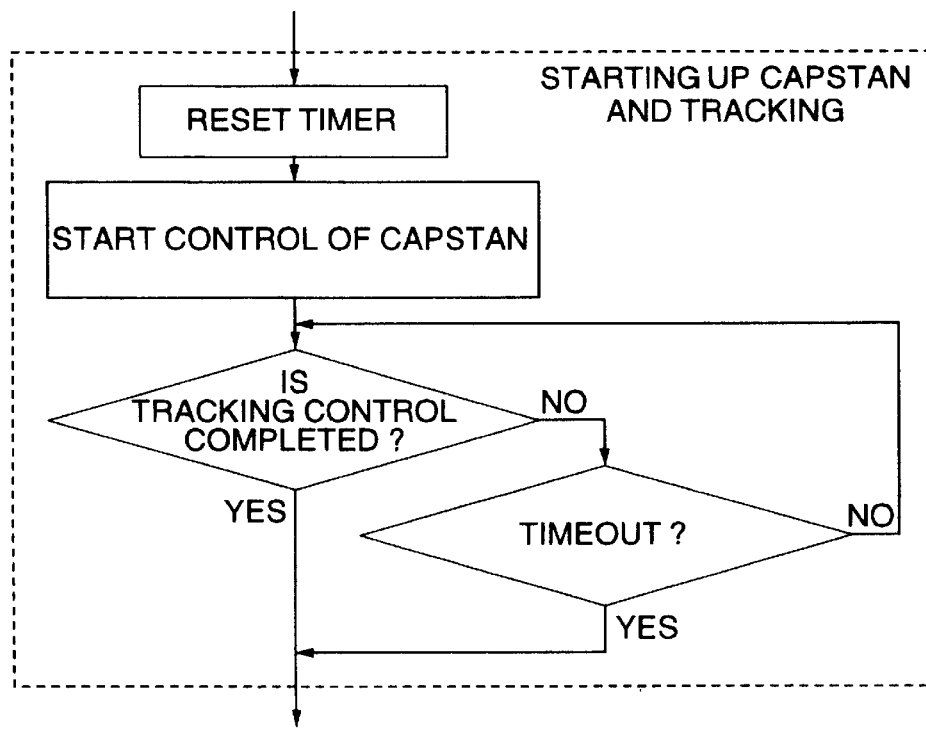
FIG. 4 is a flowchart showing a concrete example of a tracking process with a capstan started.

Herein, the detailed description will be oriented to how the system controller 41 operates to start the cylinder 21 and do the capstan start tracking with reference to FIGS. 3 and 4.

When the cylinder is started, the system controller pre-resets the timer and then gives an indication about control of a rotary speed and phase to the cylinder. In general, the control of the rotary speed and phase needs one or some seconds, for which the system controller has to wait for the start. When the start is completed or after until the waiting time (described as a timeout), the system controller 41 finishes this routine. If a timeout takes place, any fault is considered to take place in the cylinder. In this case, in general, the operation takes an alternative routine to this ordinary routine, for doing the special processing (not shown).

The substantially similar processing is executed for the capstan start and the tracking process. The system controller operates to pre-reset the timer and then gives an indication about the rotary speed of the capstan and the tracking control, that is, the phase control of the capstan. For the capstan, the speed control is terminated relatively fast (for example, within an interval of a few tens milliseconds to a few hundred milliseconds). In general, however, the tracking control needs one to some seconds, for which the system controller stays in the waiting state. When the start is completed or a timeout takes place, the system controller 41 finishes this routine. If the timeout takes place, any fault is considered to take place in the capstan. In general, the operation takes an alternative routine to this ordinary routine, for doing the special processing (not shown).

As described above, when starting the cylinder or the capstan, the system controller 41 waits for the termination of the start with the timer. The waiting process described with reference to FIGS. 3 and 4 is different from the waiting process executed before starting the capstan as described with reference to FIG. 2. The waiting process executed before starting the capstan as described with reference to FIG. 2 means a process of waiting for the start of the display block 100 or the camera block 101 after it is powered and for user's definition of an angle of view.

Figure 5:
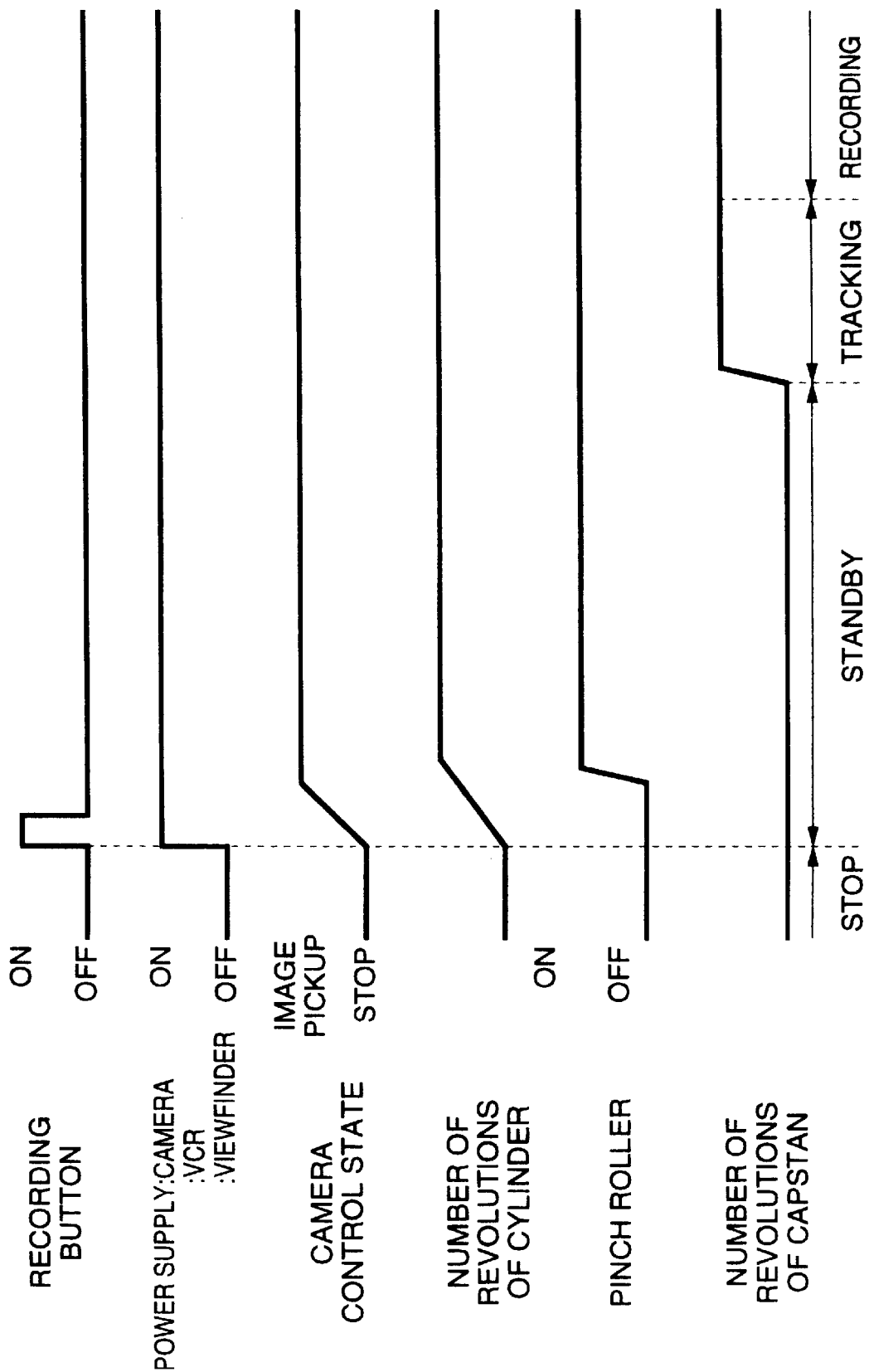
FIG. 5 is a timing chart appearing when the camcorder according to the first embodiment is started.

The control timing chart is shown in FIG. 5. The camera control state as shown in FIG. 5 is exemplarily shown. The oblique lines indicate transient states. When the pinch roller is at high level, it indicates the pinch-off. When the pinch roller is at low level, it indicates the pinch-on. The pinch-on timing is set as a timing on which the load applied by the tape to the cylinder does not cause any start-up failure of the cylinder when the pinch roller is in the pinch-on state.

Figure 2:
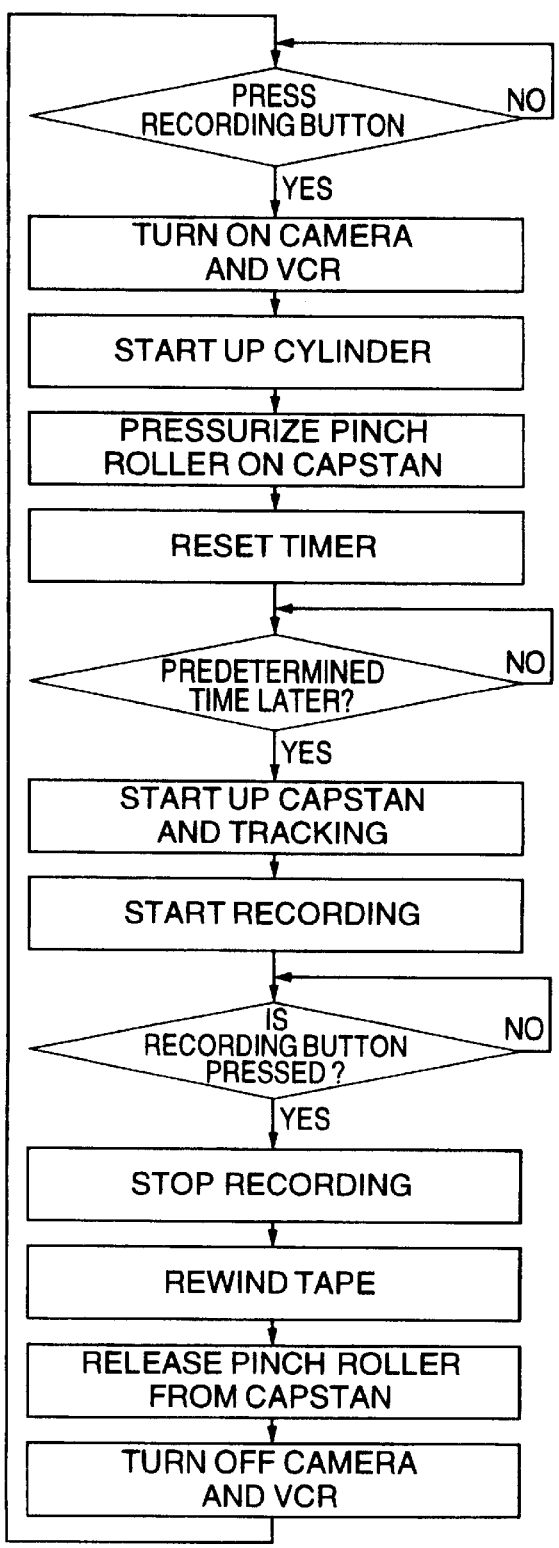
FIG. 2 is a flowchart showing a first control process executed in the first embodiment of the present invention.

In turn, the description will be oriented to the process from the REC stop to the power-off as shown in FIG. 2. If the press of the recording button 43 is sensed while recording an image sequence, the recording operation is paused. For the tracking control for achieving the next clean splice between the adjacent image sequences on the tape, a predetermined length of video tape is rewound and the capstan motor is stopped. Then, a loading motor (not shown) is driven so that the pinch roller enters into a pinch-off state.

After the foregoing process, the operation is executed to stop the power supply to the display section 100, the camera section 101, and the VCR section 102. and returns to the intial stopping state.

According to the first embodiment of the present invention, on termination of the recording, the display section 100, the camera section 101 and the VCR section 102 are all powered off. This prevents the waste of the electric power. The waiting time is secured between when the recording button is pressed and when the recording is started. During this time, hence, the user may set an angle of view through the electronic viewfinder. This prevents an unnecessary image sequence from being recorded on the video tape.

Figure 6:
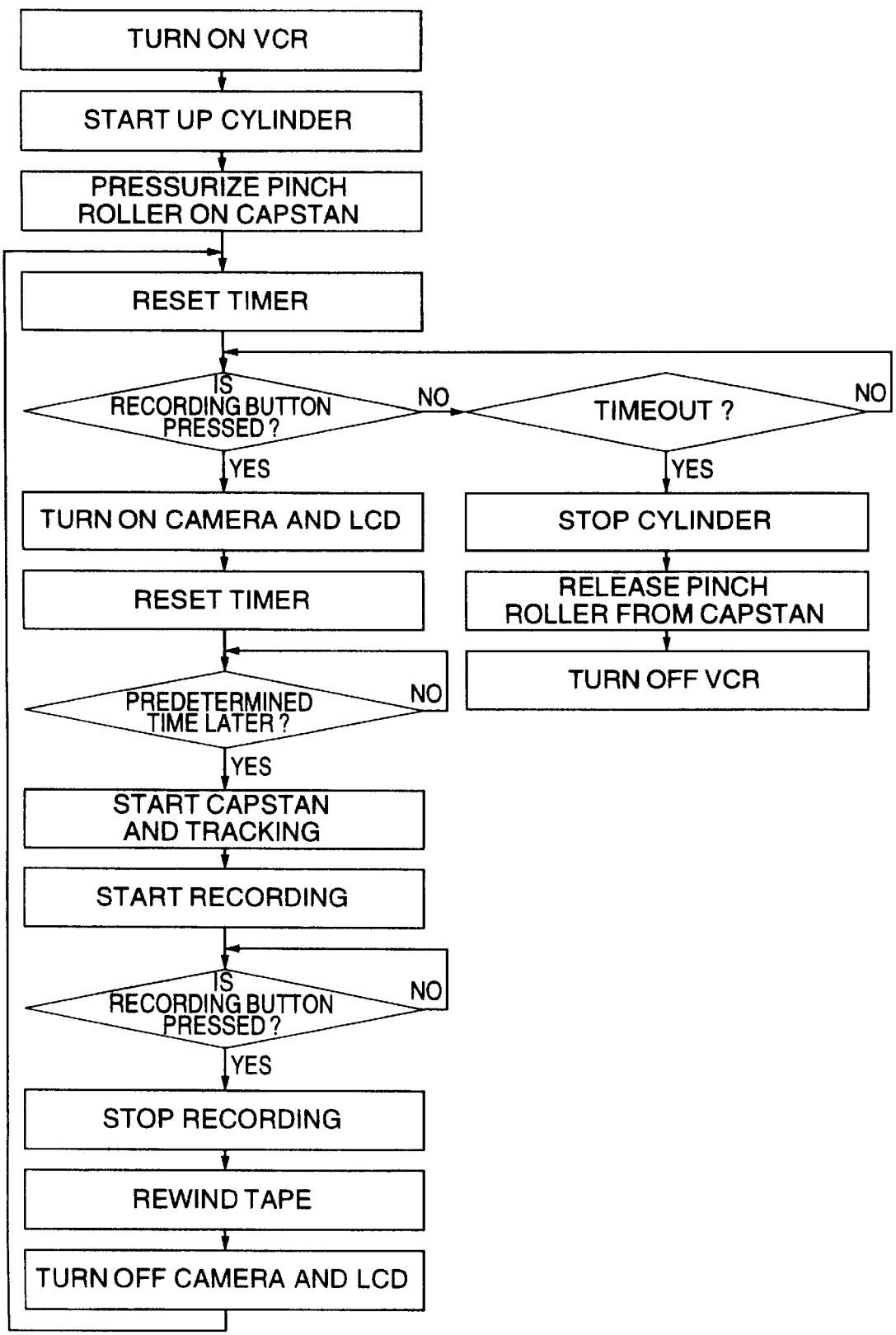
FIG. 6 is a flowchart showing a second control process of the camcorder according to the first embodiment.

In turn, the description will be oriented to the transformed processing of the system controller 41 in the arrangement of FIG. 1 with reference to the flowchart of FIG. 6.

Since the cylinder has relatively large inertial force, once the cylinder starts the rotation, its power consumption is relatively low. Hence, if image sequences are recorded at short intervals, the continuous rotation of the cylinder may lower its power consumption rather than the repetition of the start and the stop of the cylinder. After a main switch 47 is turned on, the system controller 41 starts the power conduction to the VCR section only for actuating the cylinder and gives an indication about pressurizing the pinch roller on the capstan to the pinch roller. In this state, the system controller 41 monitors the state of the recording button 43. If the press of the button 4 is sensed the system controller 41 starts to perform a series of processes after the process of sensing the recording button before starting the recording, except the processes of starting or stopping the cylinder and turning on and off the pinch roller.

When the series of processes are terminated, the operation returns to the process of sensing the recording button before starting the actual recording operation, where the cylinder still keeps its rotation. When the user presses the recording button again, the series of processes are repeated. If the user does not press the recording button, after resetting the timer, the system controller performs the processes of sensing the recording button as well as monitoring the timeout, which are for automatically stopping the cylinder. When the system controller 41 senses the timeout, after the cylinder is stopped, the pinch roller is released from the capstan and the VCR section is turned off.

The system of this embodiment provides an effect of suppressing the power consumption more if the REC start and pause are repeated at short intervals.

Figure 7:
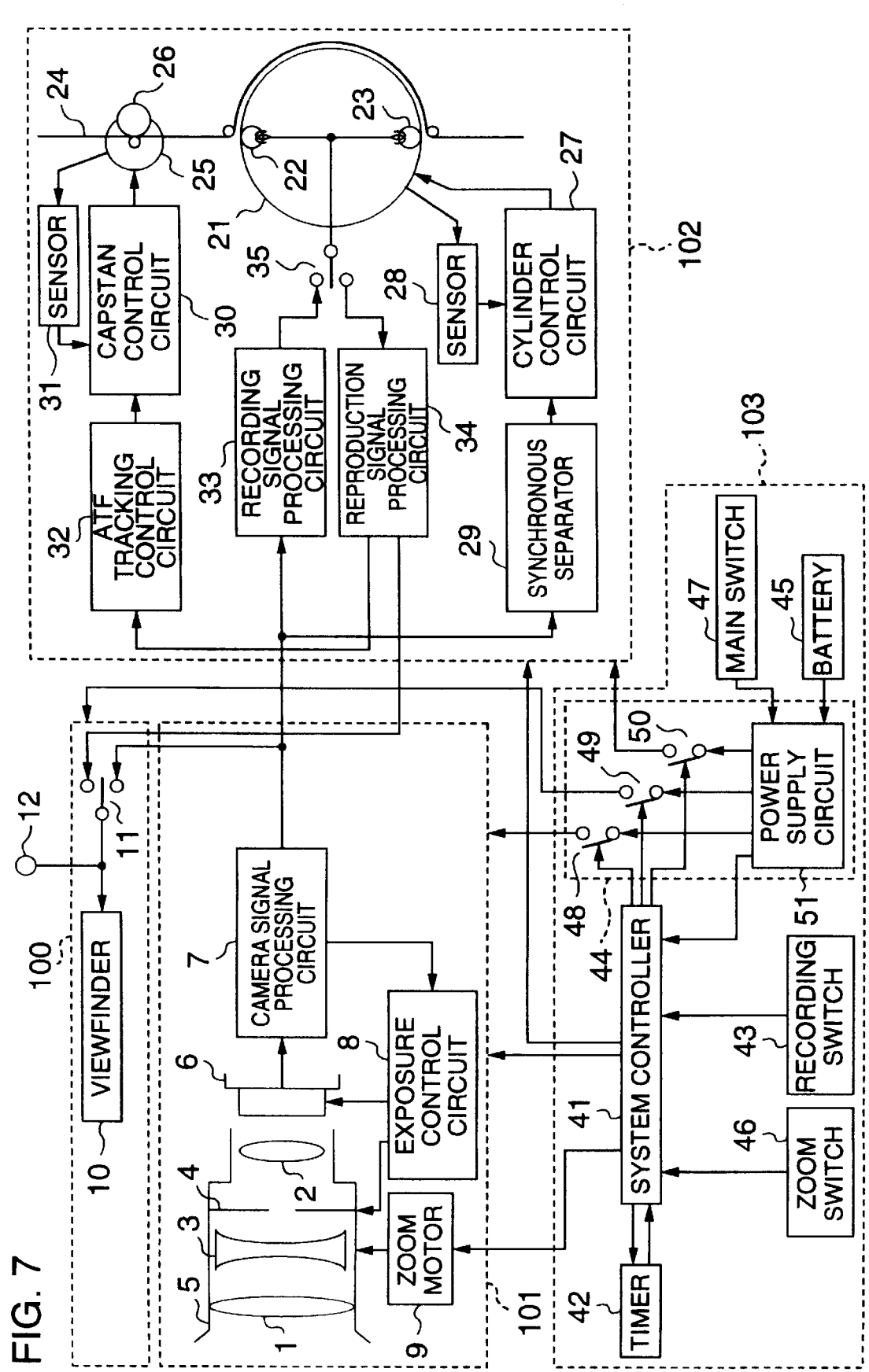
FIG. 7 is a block diagram showing a camcorder according to a second embodiment of the present invention.

Next, the description will be oriented to the second embodiment of the present invention wit h reference to FIG. 7. The system of this embodiment is arranged so that the user may set an angle of view when starting up the shoot. The main arrangement and operation of this embodiment are the same as those of the first embodiment. Hence, only the difference will be described below. The following components are added to the arrangement shown in FIG. 1. A numeral 3 denotes a zoom lens. A numeral 9 denotes a motor having a driving circuit for moving the zoom lens. A numeral 46 denotes a zoom switch used so that the user controls the movement of the zoom motor.

Figure 8:
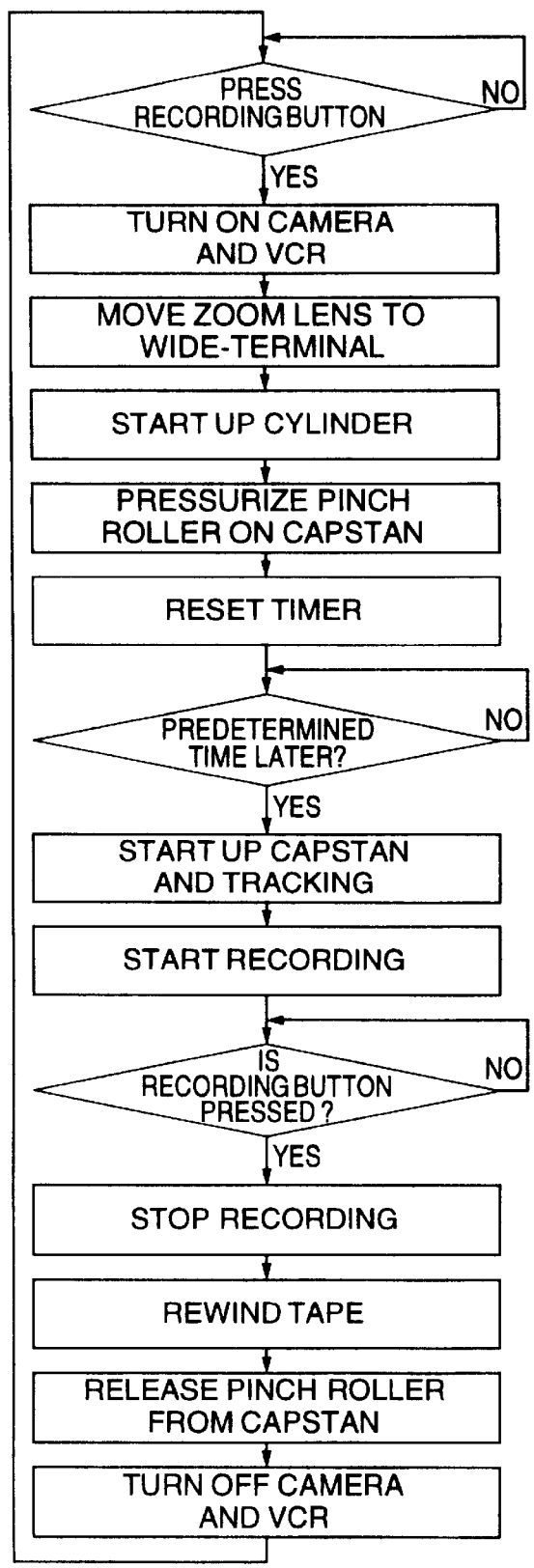
FIG. 8 is a flowchart showing a first control process of the camcorder according to the second embodiment.
Figure 9:
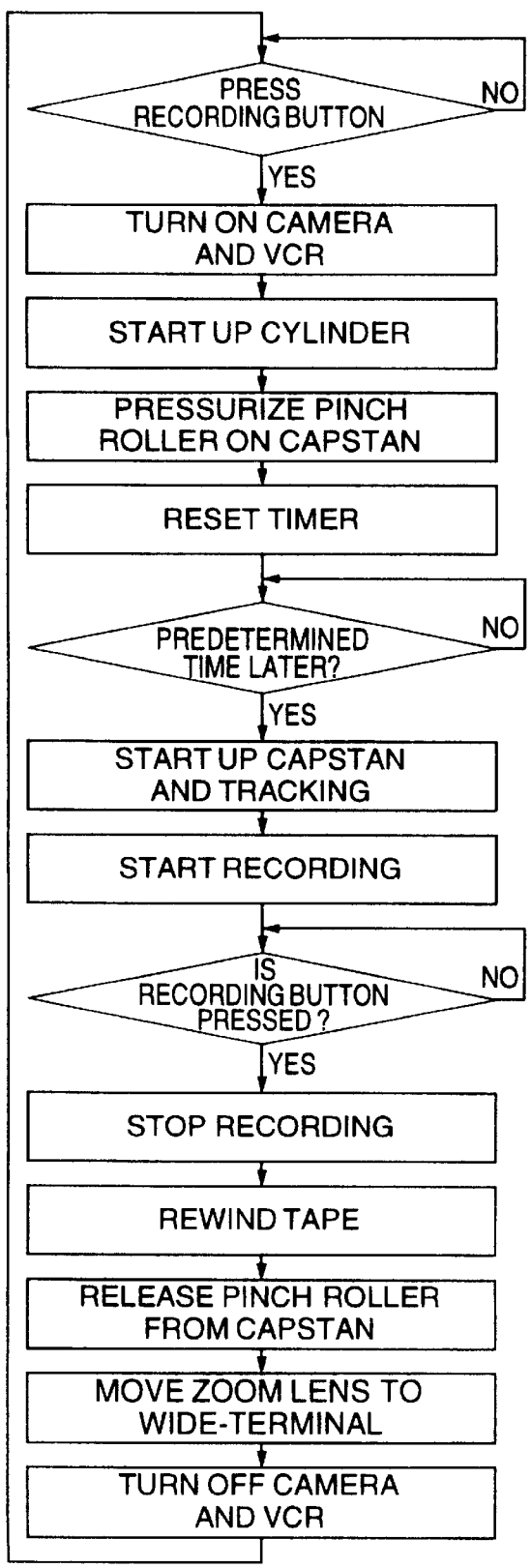
FIG. 9 is a flowchart showing a second control process of the camcorder according to the second embodiment.

The arrangement of this invention allows the user to make sure of the picked image sequence on the electronic viewfinder as soon as the recording button is pressed. If a zoom lens is located on a Tele-terminal when starting the shoot, an object is magnified on the electronic viewfinder. This makes it difficult for the shooter to find the object. To overcome this shortcoming, the system of the second embodiment is arranged to return the zoom lens to the Wide-terminal when starting the shoot. The operation of this embodiment will be described with reference to the flowchart of FIG. 8. This is basically likewise to the flowchart of FIG. 2 about which the first embodiment of the invention has been described, except the process of saving the zoom lens to the Wide-terminal after the camera section is powered. In place, as shown in FIG. 9, this process may be provided after the recording is finished and before the camera section is powered off. In this case, this process offers the same effect.

Figure 10:
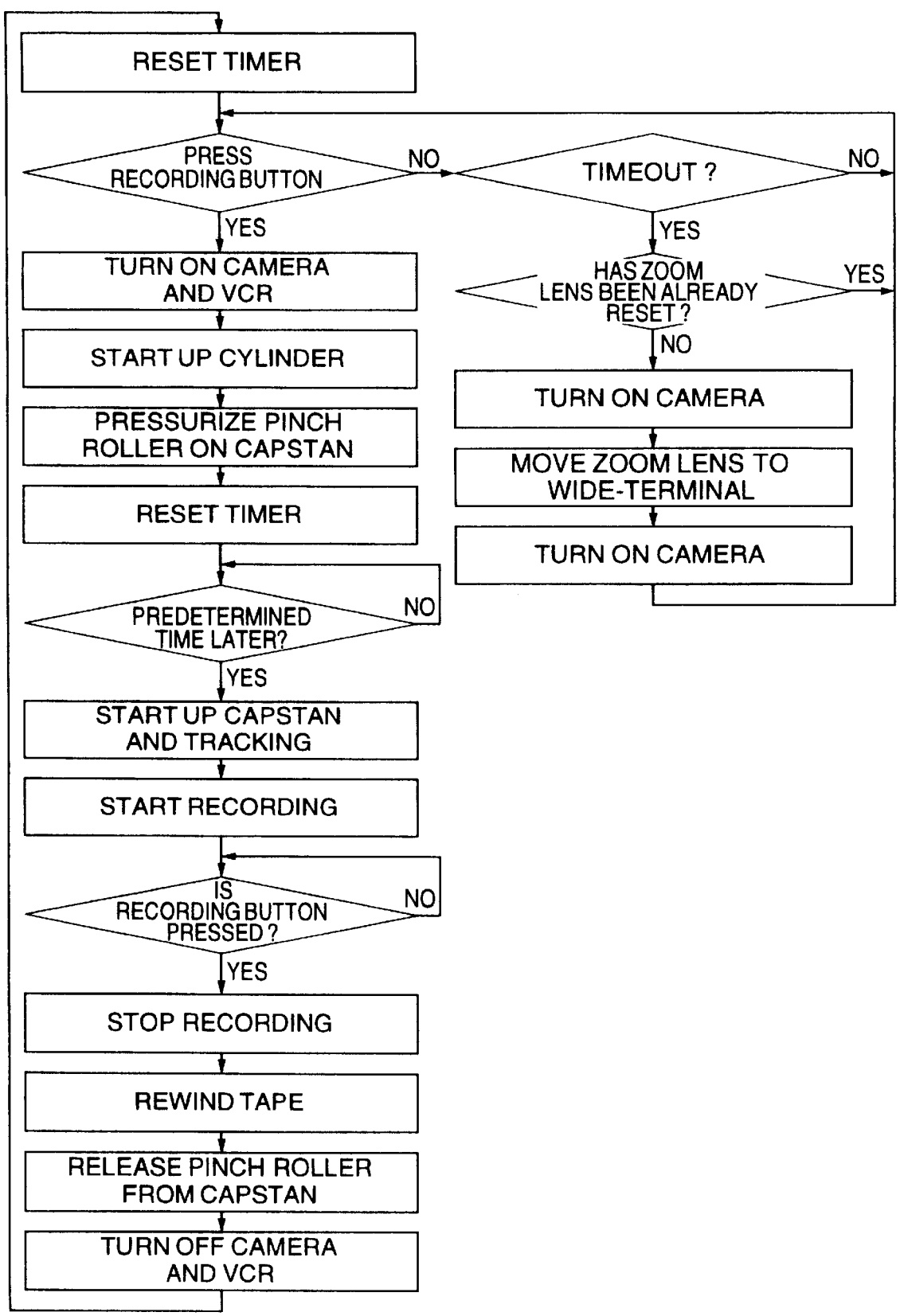
FIG. 10 is a flowchart showing a third control process of the camcorder according to the second embodiment.

As shown in FIG. 10, the system controller 41 operates to reset the timer before doing the process of sensing the press of the recording button prior to the actual recording process and monitor the timeout concurrently with the process of sensing the press of the recording button. When the timeout is sensed, the system controller 41 operates to energize only the camera section, move the zoom lens to the Wide-terminal, and de-energize the camera section. This prevents the movement of the zoom lens to the Wide-terminal at each time of the REC start or the REC pause if the repetition of the REC start and pause is carried out at short intervals, thereby improving the operativity of the camcorder.

Figure 11:
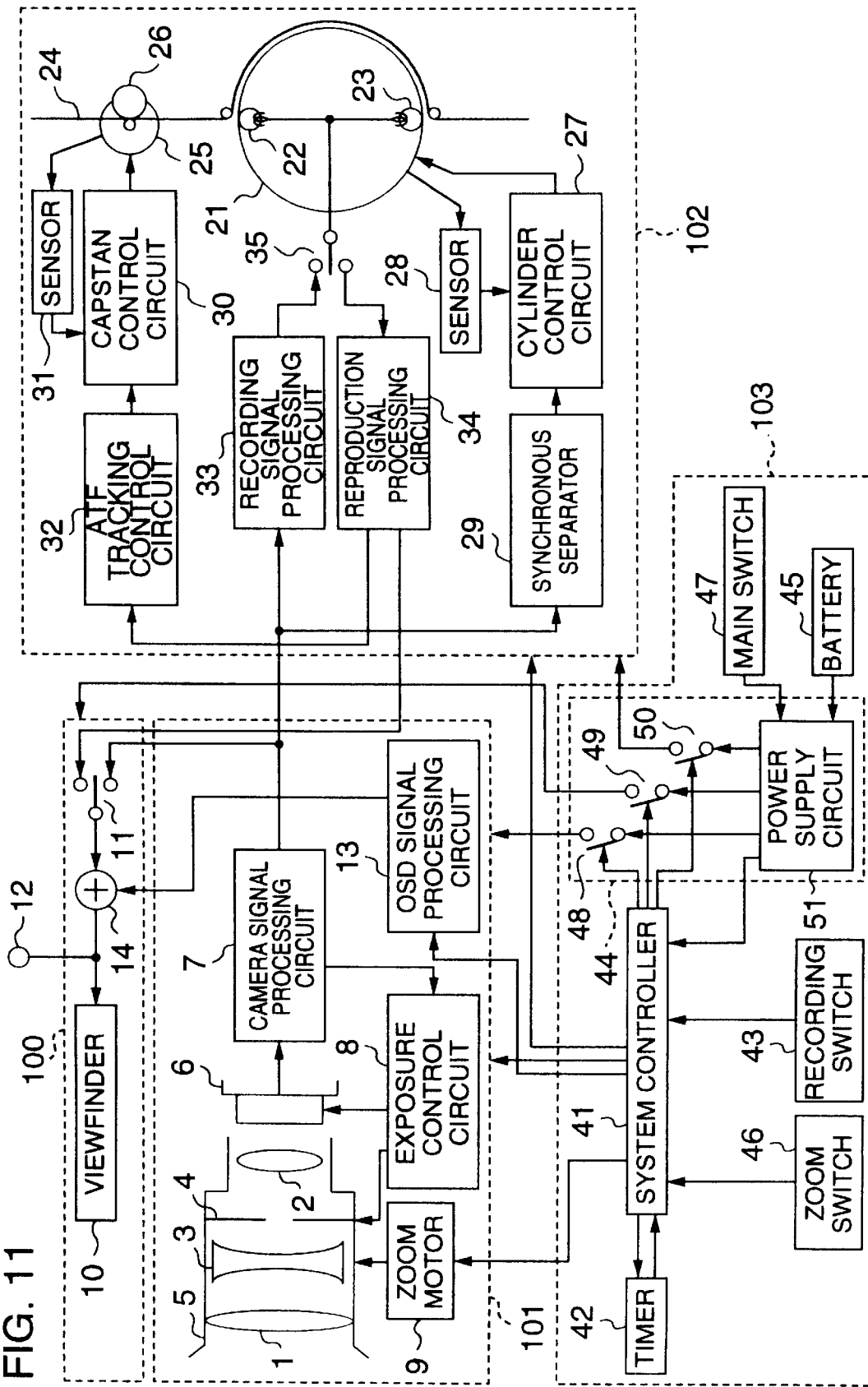
FIG. 11 is a block diagram showing a camcorder according to a third embodiment of the present invention.

In turn, the description will be oriented to the third embodiment of the present invention with reference to FIG. 11. The third embodiment of the invention mainly has the same arrangement as the second embodiment described with reference to FIG. 7. Hence, only the difference therebetween will be described below. The additional components of the arrangement shown in FIG. 11 are an OSD (On Screen Display) signal processing circuit 13 and an adding circuit. The OSD signal processing circuit 13 operates to produce a signal for overlapping text information on a video signal based on a control signal sent from the system controller 41. The adding circuit operates to add an OSD signal output from the circuit 13 to an image pickup signal or a reproduction signal.

Figure 12:
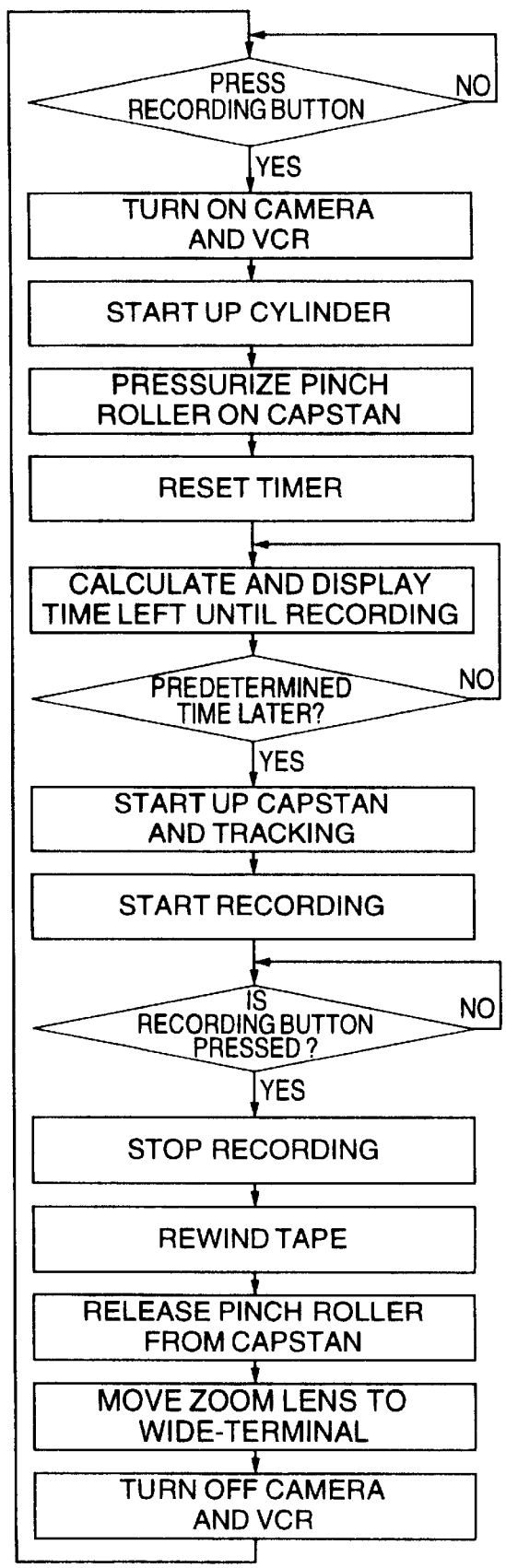
FIG. 12 is a flowchart showing a third control process of the camcorder according to the third embodiment.
Figure 13:
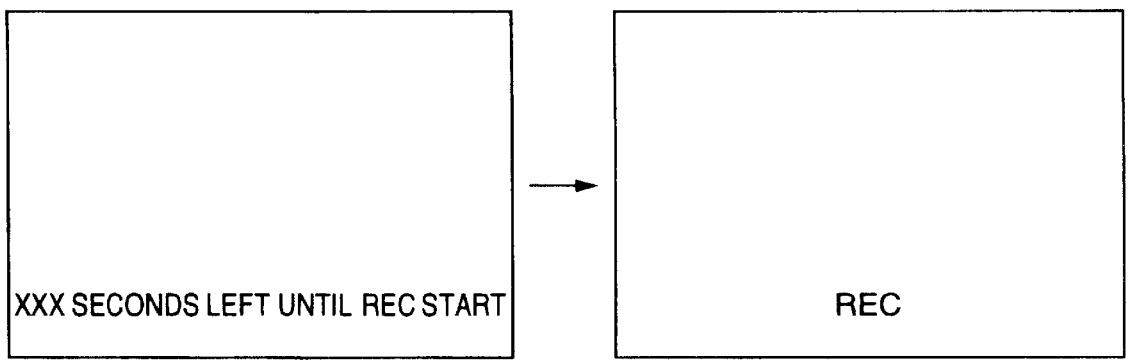
FIG. 13 is a model view showing a display example appearing in the camcorder according to the third embodiment.

Next, the description will be oriented to a control flow of the third embodiment of the invention executed under the control of the system controller 41. The control flow shown in FIG. 12 is basically analogous to the flow shown in FIG. 2. Hence, only the difference therebetween will be described below. The control flow of FIG. 12 includes an additional step of calculating a time left until the REC start and displaying the time in the loop of waiting for the REC start during a predetermined time. And, it further includes another additional step of displaying a REC start after terminating the waiting loop. As shown in FIG. 13, the operation of this additional step allows the time left until the REC start to be contained on the image pickup signal selected by the switch 11 every moment and the text information meaning the REC start to be displayed on the electronic viewfinder or the LCD at the substantially same time as the REC start.

The foregoing procedure makes it possible for the user to easily grasp the time left until the REC start and set the field of view.

Figure 14:
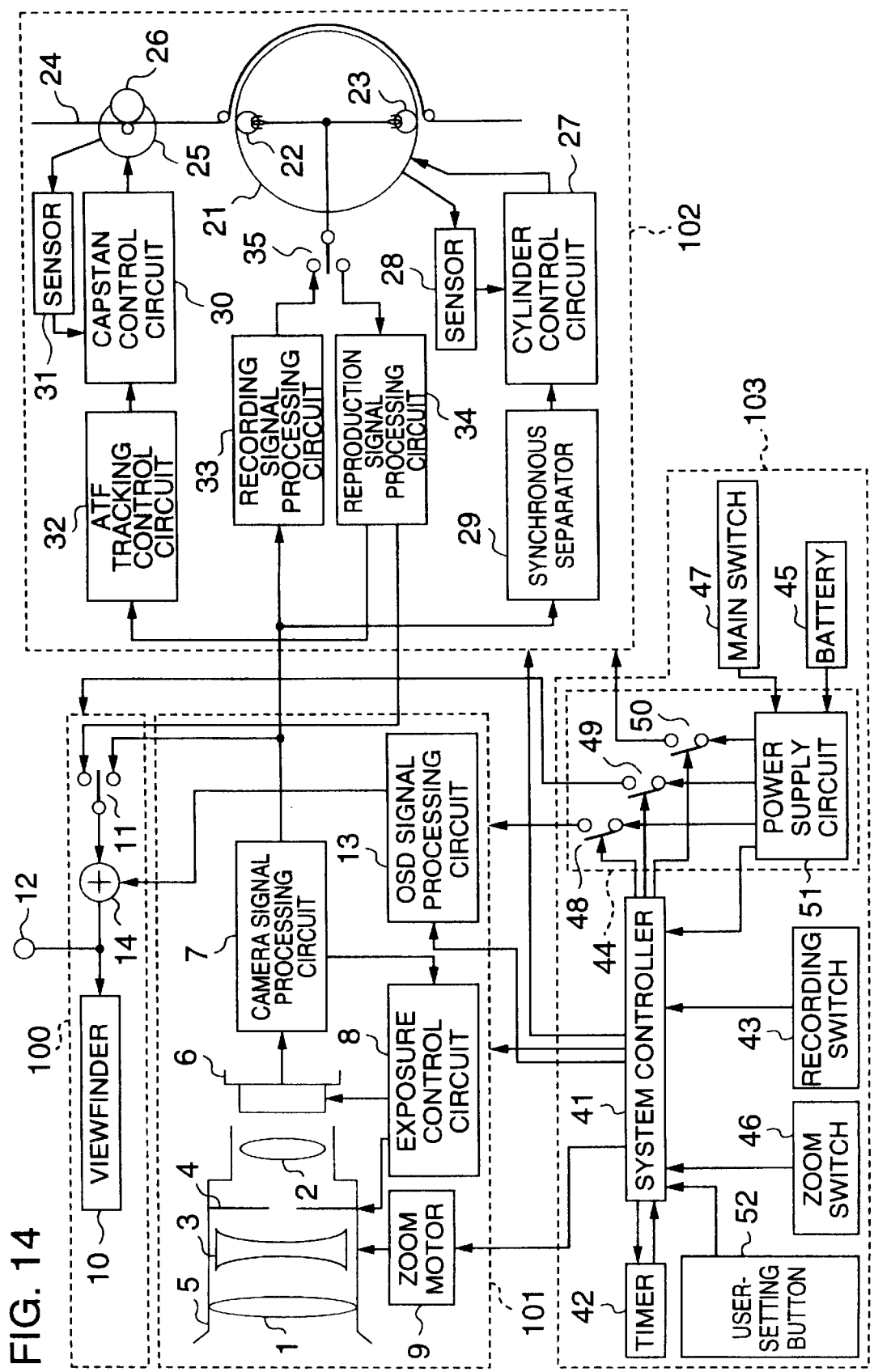
FIG. 14 is a model view showing a camcorder according to a fourth embodiment of the present invention.

Next, the description will be oriented to the fourth embodiment of the present invention with reference to FIG. 14. The arrangement of the fourth embodiment is basically analogous to the arrangement of the third embodiment described with reference to FIG. 11. Hence, only the difference therebetween will be described below. The additional component of the arrangement of FIG. 14 to the arrangement of FIG. 11 is a user-setting button 52.

Figure 15:
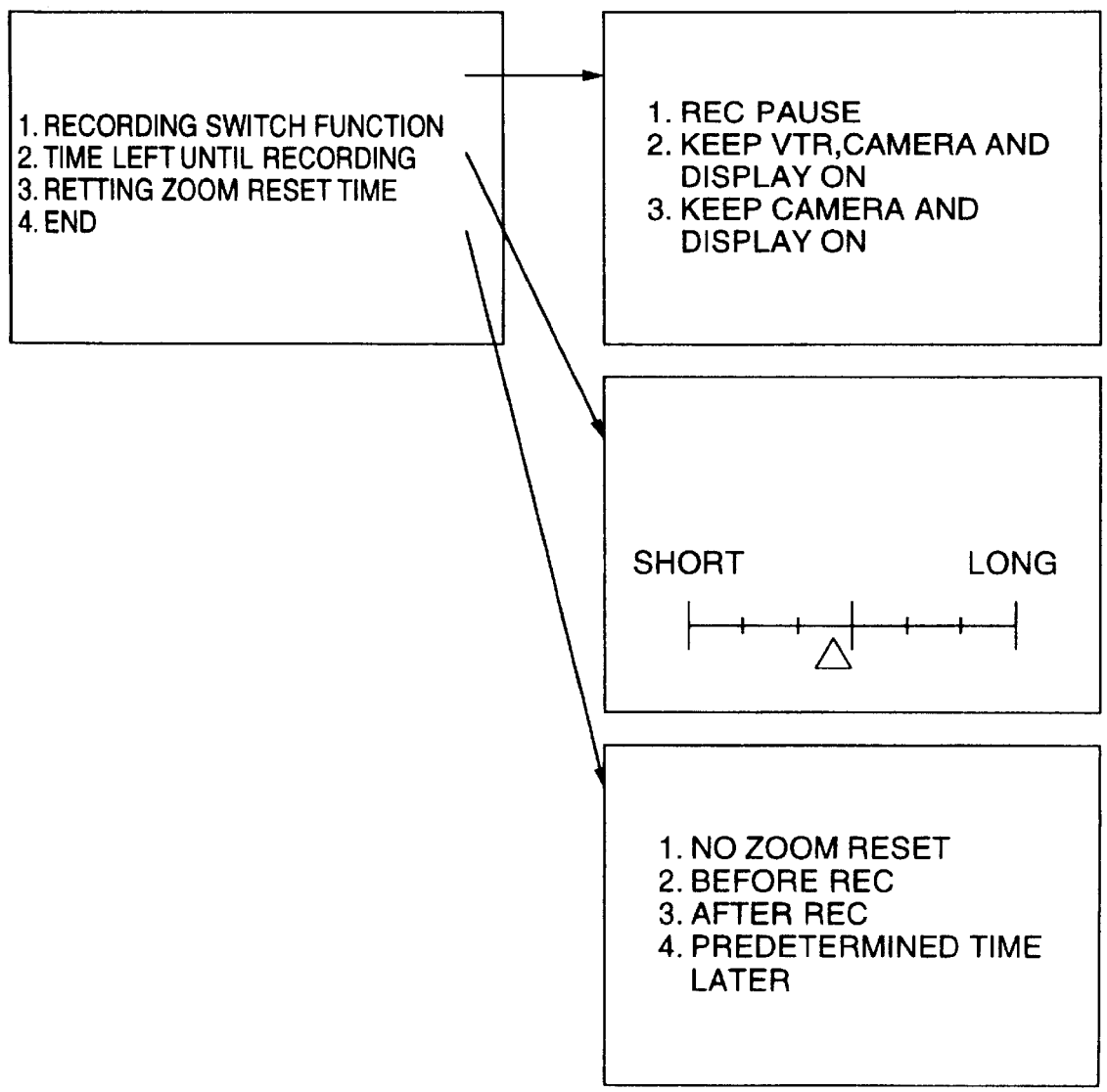
FIG. 15 is a model view showing a display example appearing in the camcorder according to the fourth embodiment.

The foregoing description has been oriented to the first to third embodiments of the invention in which various functions are realized by some ways. The fourth embodiment of the invention shown in FIG. 14 concerns with the arrangement having means for allowing the user to set various functions. The concrete arrangement will be described in FIG. 15. When the user presses the user-setting button, the system controller 41 operates to send a command to the OSD signal processing circuit 13 so that a main menu screen is displayed. In this state, the system functions a zoom switch as a menu-selecting switch. Ordinarily, that is, the zoom switch 46 can supply a two-way indication for the Tele-terminal or the Wide-terminal to the system controller 41. The system controller 41 utilizes the two-way indication as an up-down switch for selecting a menu. This kind of use of the switch may be freely arranged according to the function of the system. A leased switch for selecting a menu may be provided. The user-setting switch 46 may dually be used as another switch.

On the main menu screen, assume that the user handles the zoom switch 46 and presses the user-setting switch 52 in the state that the "1. REC switch function" is selected. In this assumption, the system controller 41 operates to give a command to the OSD signal processing circuit 13 and display a submenu about the function of the recording switch. As the function of the recording switch, the zoom switch 46 is operated to select one of the three cases, that is, the first case that the main switch 47 is pressed for energizing all the circuits including the display section, the camera section and the VCR section except the capstan system, that is, "REC Pause" as in the prior art, the second case that the recording switch is pressed for energizing all the circuits including the display section, the camera section and the VCR section as described about the control flow of FIG. 2, and the third case that the recording switch is pressed for energizing only the display section and the camera section. Then, the selected case is set by operating the user-setting button. After setting it, the system controller 41, again, gives a command for returning the screen to the main menu to the OSD signal processing circuit 13. This allows the user to select any one of the functions of the recording switch according to the circumstance.

Next, on the main menu screen, if the user selects "2. a time left until REC, an option appears for prompting the user to select a time left until REC, that is, a predetermined waiting time for the REC start. Herein, the use optionally sets a concrete time as the waiting time. For example, if the user places emphasis on the fast REC start rather than the left time for setting the angle of view, the user may set a short time as the waiting time. On the other hand, if the user desires a sufficient waiting time left until the REC start, the user may set a long time as the waiting time.

Next, on the main menu, the user selects any one of the control flows described with reference to FIGS. 8 to 10 as the control timing for saving the zoom lens to the Wide-terminal or selects an option of no saving the zoom lens.

Further, when the user selects "4. End" on the main menu, the system controller 41 operates to terminate the menu and go back to the normal operation. As is obvious from the above description, the user may select an option of each function according to his or her using status, for improving the operativity of the camcorder itself.

Figure 16:
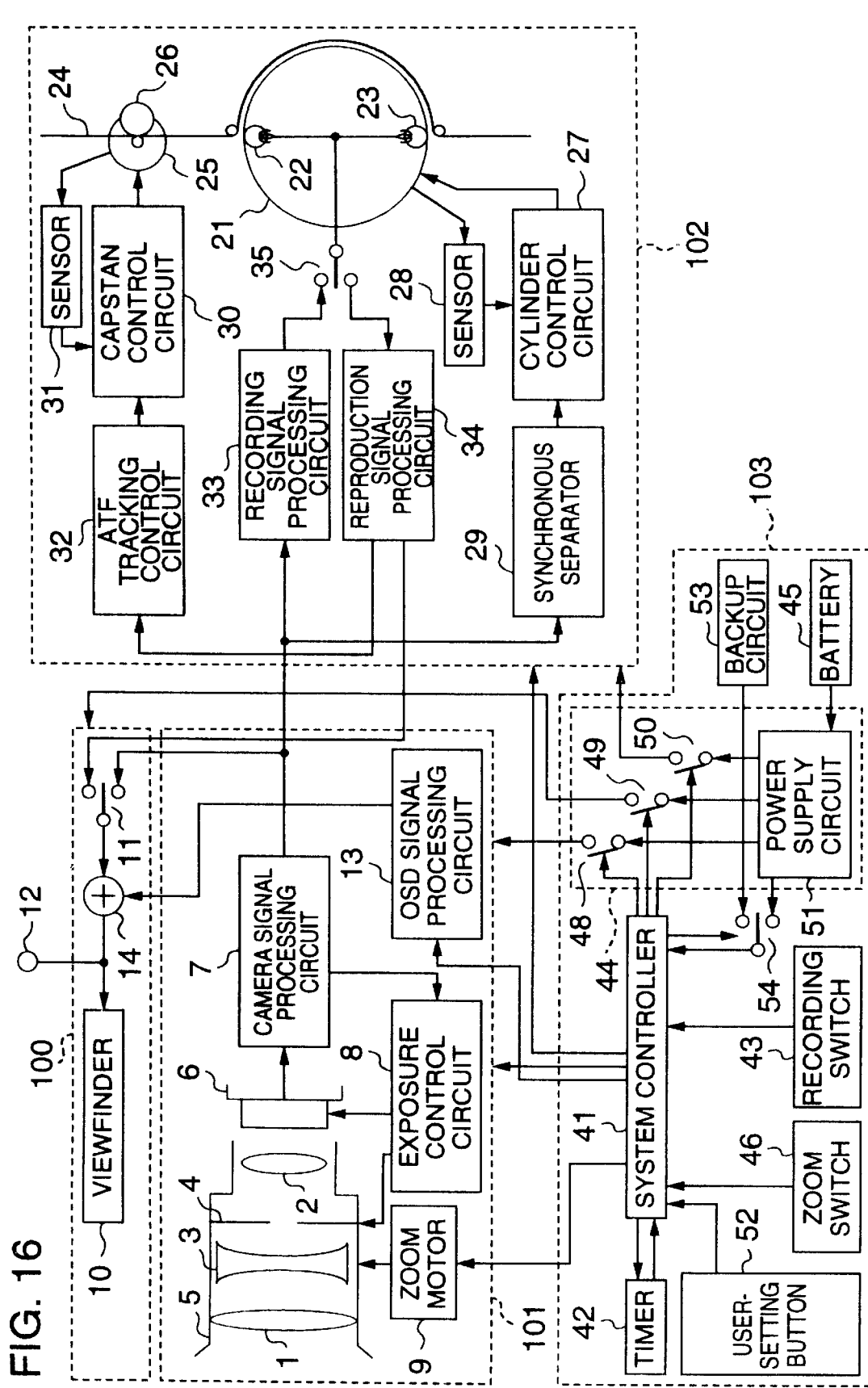
FIG. 16 is a model view showing a camcorder according to a fifth embodiment of the present invention.

Then, the description will be oriented to the fifth embodiment of the present invention with reference to FIG. 16. The fifth embodiment of the invention basically has the same arrangement as the fourth embodiment of the invention illustrated in FIG. 14. Hence, only the difference will be described below. The components to be added to or deleted from the arrangement of FIG. 14 are as follows. The deleted is the main switch 47. The added are a backup power supply 53 and a switch 54 for switching a supply signal from the backup power supply 53 to a supply signal from the power supply 51 or vice versa in response to the control signal from the system controller and sending the switched signal to the system controller 41. The foregoing arrangements enables the system controller 41 to be started by pressing the main switch 47, while the arrangement of the fifth embodiment enables the system controller 41 to be constantly worked by the power supply from the backup power supply 53. From a viewpoint of the user, this arrangement allows all the switches to be operated from the REC start and the REC pause to be collected as one recording switch 43, which provides an effect of reducing the operating steps of the user.

The foregoing description has been mainly concerned with the 8-millimeter video products. In actual, however, the present invention may apply to the other types of VCR. Further, the recording device using a recording medium rather than the magnetic tape may provide the similar effect. For example, if the invention applies to a recording device using a magnetic disk or an optical disk, the application may eliminate the adverse effect given by a start time of the disk driving device. If the invention applies to a solid recording device using a memory, the application may also eliminate the adverse effect given by a start time of a camera.

The system of the present invention may reduce the unnecessary power consumption of any operating time except the recording because of the automatic interrupt of the power supply at the REC pause. When the recording is started, a waiting time is secured between when a picture appears on the electronic viewfinder or the like and when the actual recording is started, so that the shooter may set the angle of view during the waiting time as desired. Since the zoom lens is located on the Wide-terminal at the REC start, it is possible to reduce the time when the shooter grasps a target object on the viewfinder or the like. Moreover, the shooter is required to handle just one button for doing the abovementioned processing.

What is claimed is:

1. A video camera comprising:
   a zoom lens:
   image pickup means successively outputting an image signal in a predetermined repeated period;
   recording means for recording said image signal on a recording medium;
   display means for displaying said image signal;
   a recording switch for indicating the start or the end of the recording operation; and
   control means provided with time measuring means, for starting power supply to said image pickup means, said recording means, and said display means in response to the indication of the recording start, for moving said zoom lens to a wide-terminal before the recording start, and for starting the recording operation of successive image signal a predetermined time later than the start of the power supply, and for continuing said recording operation until the indication of the recording end, and after indicating the recording stop, stopping the recording operation as well as controlling the power supply to said image pickup means, said recording means and said display means.

2. A video camera comprising:
   a zoom lens;
   image pickup means successively outputting an image signal in a predetermined repeated period;
   recording means for recording said image signal on a recording medium;
   display means for displaying said image signal;
   a recording switch for indicating the start or the end of the recording operation; and
   control means provided with time measuring means, for starting power supply to said image means, said recording means, and said display means in response to the indication of the recording start, and for starting the recording operation of successive image pickup signal a predetermined time later than the start of the power supply, and for continuing said recording operation until the indication of the recording end, and after indicating the recording stop, stopping the recording operation, and for moving said zoom lens to a wide-terminal, and for controlling the stop the power supply to said image pickup means, said recording means and said display means, wherein said time measuring means enables said zoom lens to be saved to the wide-terminal a predetermined time later than the recording pause before the recording start.

3. A video camera comprising:
   a zoom lens;
   image pickup means successively outputting an image signal in a predetermined repeated period:
   recording means for recording said image signal on a recording medium;
   display means for displaying said image signal;
   a recording switch for indicating the start or the end of the recording operation;
   control means provided with time measuring means, for starting power supply to said image pickup means, said recording means, and said display means in response to the indication of the recording start, and for starting the recording operation of successive image signal a predetermined time later than the start of the power supply, and for continuing said recording operation until the indication of the recording end, and for pausing the recording operation after the recording pause is indicated, and for stopping the power supply to said image pickup means, said recording means and display means; and
   selecting means for selecting one of combinations of at least two or more of the functions of moving said zoom lens to a wide-terminal before the recording start, moving said zoom lens to said wide-terminal after the recording start, and moving said zoom lens to said wide-terminal a predetermined time later than the recording pause and before the recording start using said time measuring means.

4. A video camera comprising:
   a zoom lens;
   an image pickup sensor which repeatedly outputs a signal in a predetermined period;
   a signal processor which converts said signal into moving picture signal;
   a recorder which records said moving picture signal on a recording medium;
   a display which displays said moving picture signal; a recording switch which orders start or end of recording operation; and
   a control circuit including a power supply circuit, a timer and a system controller, which starts power supply to said image pickup sensor, said recorder, and said display in response to the order of recording start, and controls said zoom lens to move to a wide-terminal before the recording start and said recorder to start the recording operation of successive moving picture signal after said timer times first predetermined time later than the start of the power supply, and controls said recorder to continue recording until the order of the recording end, and controls said recorder to stop the recording and stops power supply to said image pickup sensor, said recorder, and said display after the order of the recording end.

5. A video camera comprising:

a zoom lens;

an image pickup sensor which repeatedly outputs a signal in a predetermined period;

a signal processor which converts said signal into moving picture signal;

a recorder which records said moving picture signal on a recording medium;

a display which displays said moving picture signal;

a recording switch which orders start or end of recording operation; and a control circuit including a power supply circuit, a timer and a system controller, which starts power supply to said image pickup sensor, said recorder, and said display in response to the order of recording start, and controls said recorder to start the recording operation of successive moving picture signal after said timer times first predetermined time later than the start of the power supply, and controls said recorder to continue recording until the order of the recording end, and controls said recorder to stop the recording and stops power supply to said image pickup sensor, said recorder, and said display after the order of the recording end; and a time measuring circuit, wherein said time measuring circuit enables said zoom lens to be saved to the wide-terminal a second predetermined time later than the recording pause before the recording start.

6. A video camera comprising:

a zoom lens;

an image pickup sensor repeatedly outputs a signal in a predetermined period; a signal processor which converts said signal into moving picture signal;

a recorder which records said moving picture signal on a recording medium;

a display which displays said moving picture signal;

a recording switch which orders start or end of recording operation;

a control circuit including a power supply circuit, a timer and a system controller, which starts power supply to said image pickup sensor, said recorder, and said display in response to the order of recording start, and controls said recorded to start the recording operation of successive moving picture signal after said timer times first predetermined time later than the start of the power supply, and controls said recorder to continue recording until the order of the recording end, and controls said recorder to stop the recording and stops power supply to said image pickup sensor, said recorder, and said display after the order of the recording end; and selecting circuit for selecting one of combinations of at lest two of the functions of moving said zoom lens to a wide-terminal before the recording start, moving said zoom lens to said wide-terminal after the recording start, and moving said zoom lens to said wide-terminal a second predetermined time later than the recording pause before the recording start using said timer.

* * * * *